United States Patent
Qin et al.

(10) Patent No.: US 12,348,328 B2
(45) Date of Patent: Jul. 1, 2025

(54) COMMUNICATION METHOD AND APPARATUS APPLIED TO COMPUTER CLUSTER

(71) Applicant: Alipay (Hangzhou) Information Technology Co., Ltd., Hangzhou (CN)

(72) Inventors: Wei Qin, Hangzhou (CN); Jiping Yu, Hangzhou (CN); Xiaowei Zhu, Hangzhou (CN); Wenguang Chen, Hangzhou (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 0 days.

(21) Appl. No.: 18/572,373

(22) PCT Filed: Oct. 10, 2022

(86) PCT No.: PCT/CN2022/124372
§ 371 (c)(1),
(2) Date: Dec. 20, 2023

(87) PCT Pub. No.: WO2023/061329
PCT Pub. Date: Apr. 20, 2023

(65) Prior Publication Data
US 2024/0291684 A1 Aug. 29, 2024

(30) Foreign Application Priority Data
Oct. 11, 2021 (CN) .......................... 202111179194.2

(51) Int. Cl.
*H04L 12/18* (2006.01)
*H04L 67/10* (2022.01)

(52) U.S. Cl.
CPC ............ *H04L 12/185* (2013.01); *H04L 67/10* (2013.01)

(58) Field of Classification Search
None
See application file for complete search history.

(56) References Cited

U.S. PATENT DOCUMENTS

2014/0320497 A1 10/2014 Vojnovic et al.
2018/0315229 A1* 11/2018 Kim .................. G06F 17/16
(Continued)

FOREIGN PATENT DOCUMENTS

| CN | 111177486 A | 5/2020 |
| CN | 111737540 A | 10/2020 |

(Continued)

OTHER PUBLICATIONS

The International Search Report and Written Opinion for International Application No. PCT/CN2022/124372 mailed on Dec. 29, 2022.

*Primary Examiner* — June Sison
(74) *Attorney, Agent, or Firm* — Womble Bond Dickinson (US) LLP

(57) ABSTRACT

A computer cluster is configured to perform distributed computing on graph data, the computer cluster includes a first computer and a second computer, the first computer is configured to process a vertex in a first vertex set in the graph data, the second computer is configured to process a vertex in a second vertex set in the graph data, the first vertex set includes a first source vertex, the second vertex set includes a first destination vertex corresponding to the first source vertex. A communication method includes: generating information of the first source vertex; determining the second computer based on pre-recorded mapping relationship information, where the second computer is configured to process information of the first destination vertex; and sending a first communication message to the second com- (Continued)

puter, where the first communication message includes the information of the first source vertex.

6 Claims, 1 Drawing Sheet

(56) References Cited

U.S. PATENT DOCUMENTS

2020/0183740 A1\* 6/2020 Yamaoka .............. H04L 41/145
2021/0042102 A1\* 2/2021 Koupy ................. G06F 16/278

FOREIGN PATENT DOCUMENTS

| CN | 112114984 A | 12/2020 |
| CN | 113630476 A | 11/2021 |
| CN | 114189518 A | 3/2022 |

\* cited by examiner

COMMUNICATION METHOD AND APPARATUS APPLIED TO COMPUTER CLUSTER

CROSS-REFERENCE TO RELATED APPLICATIONS

This application is a national stage entry of International Application No. PCT/CN2022/124372, filed on Oct. 10, 2022, which claims priority to Chinese Application No. 202111179194.2, filed on Oct. 11, 2021, the contents of which are incorporated herein by reference in their entirety.

TECHNICAL FIELD

The present disclosure relates to the field of distributed graph computing technologies, and in particular, to a communication method and apparatus applied to a computer cluster.

BACKGROUND

In a distributed graph computing technology, graph data can be divided into a plurality of parts, which can be respectively processed by a plurality of computers in a computer cluster. The plurality of computers in the computer cluster need to communicate with each other to exchange data, so that a computer processing a destination vertex can acquire information of a source vertex, so as to update information of the destination vertex. In a conventional technology, a computer implements communication by broadcasting information of a vertex indiscriminately to all computers in a cluster. This leads to unnecessary communication traffic and increases network pressure.

SUMMARY

In view of the foregoing description, the present disclosure provides a communication method and apparatus applied to a computer cluster.

According to a first aspect, the present disclosure provides a communication method applied to a computer cluster. The computer cluster is configured to perform distributed computing on graph data, the computer cluster includes a first computer and a second computer, the first computer is configured to process a vertex in a first vertex set in the graph data, the second computer is configured to process a vertex in a second vertex set in the graph data, the first vertex set includes a first source vertex, the second vertex set includes a first destination vertex corresponding to the first source vertex, and the method is applied to the first computer. The method includes: generating information of the first source vertex; determining the second computer based on pre-recorded mapping relationship information, where the second computer is configured to process information of the first destination vertex; and sending a first communication message to the second computer, where the first communication message includes the information of the first source vertex, so that the second computer updates the information of the first destination vertex based on the information of the first source vertex.

Optionally, the generating information of the first source vertex includes: generating a graph embedding vector corresponding to the first source vertex; and deleting some or all of zero elements in the graph embedding vector corresponding to the first source vertex, to obtain the information of the first source vertex.

Optionally, the first computer exchanges a communication message with another computer in the computer cluster in a round-robin manner.

Optionally, the first vertex set further includes a plurality of destination vertices, and the plurality of destination vertices respectively correspond to a plurality of source vertices; the method further includes: receiving a second communication message, where the second communication message includes information of the plurality of source vertices; and processing the information of the plurality of source vertices in parallel by using a plurality of threads.

Optionally, the computer cluster performs a graph learning task based on the graph data.

According to a second aspect, the present disclosure provides a communication apparatus. The communication apparatus is a first computer in a computer cluster, the computer cluster is configured to perform distributed computing on graph data, the computer cluster further includes a second computer, the first computer is configured to process a vertex in a first vertex set in the graph data, the second computer is configured to process a vertex in a second vertex set in the graph data, the first vertex set includes a first source vertex, and the second vertex set includes a first destination vertex corresponding to the first source vertex. The communication apparatus includes: a first generating module, configured to generate information of the first source vertex; a determining module, configured to determine the second computer based on pre-recorded mapping relationship information, where the second computer is configured to process information of the first destination vertex; and a sending module, configured to send a first communication message to the second computer, where the first communication message includes the information of the first source vertex, so that the second computer updates the information of the first destination vertex based on the information of the first source vertex.

Optionally, the first generating module includes: a second generating module, configured to generate a graph embedding vector corresponding to the first source vertex; and a deleting module, configured to delete some or all of zero elements in the graph embedding vector corresponding to the first source vertex, to obtain the information of the first source vertex.

Optionally, the first computer exchanges a communication message with another computer in the computer cluster in a round-robin manner.

Optionally, the first vertex set further includes a plurality of destination vertices, and the plurality of destination vertices respectively correspond to a plurality of source vertices; the communication apparatus further includes: a receiving module, configured to receive a second communication message, where the second communication message includes information of the plurality of source vertices; and a processing module, configured to process the information of the plurality of source vertices in parallel by using a plurality of threads.

Optionally, the computer cluster performs a graph learning task based on the graph data.

According to a third aspect, the present disclosure provides an apparatus, where the apparatus includes a memory and a processor, the memory stores executable code, and the processor is configured to execute the executable code to implement the method according to the first aspect.

According to the present disclosure, the second computer in which the first destination vertex corresponding to the first source vertex processed by the first computer is located can be determined based on the pre-recorded mapping relationship information. Therefore, the information of the first source vertex can be pertinently transmitted to the second computer, without a need to broadcast the information of the first source vertex indiscriminately to all computers in the cluster, thereby avoiding unwanted communication in a computer communication process in the cluster, and reducing network overheads of communication.

DESCRIPTION OF EMBODIMENTS

Figure 1:
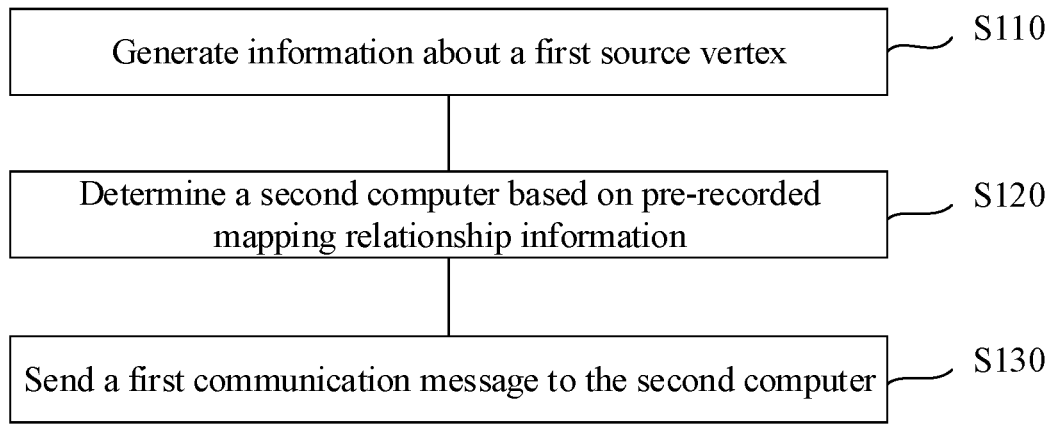
FIG. 1 is a schematic diagram of a communication method applied to a computer cluster according to an embodiment of the present disclosure.

The following clearly and comprehensively describes the technical solutions in embodiments of the present disclosure with reference to the accompanying drawings in the embodiments of the present disclosure. Clearly, the described embodiments are merely some rather than all of the embodiments of the present disclosure.

A graph is a common data structure. Data can be abstracted as a graph to form graph data. A data element in a graph may be referred to as a vertex, and the vertex may also be referred to as a node or a point. There may exist a relationship between any two vertices, and such a relationship can be represented by an edge. Vertices connected by edges are neighboring vertices. It can be understood that a graph may include a finite non-empty set of vertices and a set of edges that connect the vertices. The graph data may include information of a topology, a vertex, and/or an edge of the graph.

A graph can be denoted as $G=(V, E)$. G represents a graph, V represents a set of all vertices in the graph G, and E represents a set of edges in the graph G. u and v can represent any two vertices in V, that is, $u, v \in V$. An edge between any two vertices can be denoted as e. For example, the edge e between the vertex u and the vertex v can be denoted as $e=(u, v)$.

Edges may be directional or non-directional. A directional edge may be referred to as a directed edge, and a non-directional edge may be referred to as an undirected edge. A graph including a directed edge may be referred to as a directed graph, and a graph including an undirected edge may be referred to as an undirected graph. The present disclosure can be applied to a directed graph, or can be applied to an undirected graph.

A directed edge goes from a source vertex (src) to a destination vertex (dst). For the source vertex, the directed edge may be referred to as an outgoing edge. For the destination vertex, the directed edge may be referred to as an incoming edge. A directed edge can be denoted as (src, dst). For example, the edge $e=(u, v)$ can indicate that the edge e is a directed edge going from the vertex u to the vertex v. For the vertex u, the edge e is an outgoing edge. For the vertex v, the edge e is an incoming edge. It should be noted that the source vertex may be referred to as an ingress point, and the destination vertex may be referred to as an egress point.

An undirected edge can be converted into two directed edges in different directions. For example, the edge e may be an undirected edge between the vertex u and the vertex v. The edge e can be converted into two directed edges e1 and e2. The edge e1 may be an edge going from the vertex u to the vertex v, denoted as $e1=(u, v)$. The edge e2 may be an edge going from the vertex v to the vertex u, denoted as $e2=(v, u)$.

It should be noted that a vertex may be a source vertex, may be a destination vertex, or may be both a source vertex and a destination vertex, depending on the edge connected to the vertex. The first vertex is used as an example. When the first vertex is connected to another vertex by using an incoming edge, for the incoming edge, the first vertex is a destination vertex. When the first vertex is connected to another vertex by using an outgoing edge, for the outgoing edge, the first vertex is a source vertex. When the first vertex is connected to a plurality of edges including both incoming and outgoing edges, for the outgoing edge, the first vertex is a source vertex, and for the incoming edge, the first vertex is a destination vertex.

In different scenarios, data is converted into graph data, and many different applications can be implemented through computing of the graph data. For example, applications such as financial risk assessment, advertisement recommendation, social relationship prediction, and traffic dispatching can be implemented based on the graph data.

For example, the graph data is used for financial credit evaluation. The vertex may be a user, a financial institution, etc. The information of the vertex may include data such as information of the user, a credit score of the user, or information of the financial institution. The edge can represent a relationship between users, or a relationship between a user and a financial institution, for example, the edge can represent a friendship, a partnership, etc. Alternatively, the edge can represent an operation or behavior of one vertex on another vertex, for example, the edge can represent fund transfer, loan, consumption, or deposit. Based on such a graph, a known credit score of a user can be used to evaluate or predict a credit score of another user who has a friendship with the user. Alternatively, based on such a graph, a financial behavior such as fund transfer or loan of a user can be used to evaluate a credit score of the user.

Alternatively, for example, the graph data is used for advertisement recommendation. The vertex may be a user, an advertisement, a product, etc. The information of the vertex may include information of the user, product introduction, an advertisement click-through rate, etc. The edge may be a behavior of the user, for example, a purchase or a click. Based on such a graph, a probability of a user clicking a specific advertisement can be predicted based on the user's historical records of purchasing a product or a behavior of clicking an advertisement, so as to implement personalized advertisement recommendation for different users.

There are a plurality of methods for computing or processing the graph data, which are not limited in the present disclosure. For example, graph-based machine learning can be implemented to perform a graph learning task.

Graph learning may be neural network learning based on a graph structure. The graph learning may include a learning phase and a prediction phase of a graph. In the learning phase, a model can be trained or learned using training data. In the prediction phase, a prediction result can be obtained based on the trained model and data to be predicted.

Common neural networks applied to graph learning include a graph convolutional network (GCN), a graph attention network (GAT), etc. Like a convolutional neural networks (CNN), an object of the GCN is graph data. The GAT can aggregate neighboring nodes by using a selfattention mechanism, so as to implement adaptive matching of weights for different neighbors, thereby improving model accuracy.

During computation on the graph data, a graph embedding vector can be used to represent a graph. For example, during graph learning, representation or embedding of a vertex or an edge can be implemented through embedding.

The graph embedding vector can convert the information of a vertex or an edge from a discrete variable to a continuous variable. For example, a vertex in the graph is an advertisement. The graph embedding vector can represent a discrete variable such as content or a topic of the advertisement as a continuous vector.

With reference to the above-mentioned application of the graph data, it can be understood that, during computation on the graph, information of a destination vertex can be updated based on information of a source vertex. Using graph learning as an example, the GCN or GAT can update a graph embedding vector of a destination vertex by collecting a graph embedding vector of a neighboring vertex.

With the development of technologies, a data scale continues to grow. For big data, if massive data is abstracted as graphs, the graph data includes a huge quantity of vertices and edges. Some graph data may even have hundreds of millions of vertices or edges. Processing such massive data requires huge resources. In this case, a computer cluster can be used to process the massive data.

The computer cluster may include a plurality of computers (which may also be referred to as nodes), and can be used to perform distributed computing on the graph data. In a preprocessing phase, the graph data can be divided into a plurality of parts. The plurality of computers in the cluster can compute the plurality of parts of the graph data, respectively. The information of the vertices of the graph can be transmitted between the vertices by using edges. Therefore, data can be exchanged (including sending and/or receiving) between different computers by using edges, thereby implementing communication between computers. When the computer cluster is used to perform distributed processing on the graph data, impact of distributed computing on aspects such as central processing unit (CPU) computation and network communication needs to be considered.

It can be learned from the foregoing description that, based on the graph, information of a destination vertex can be updated based on information of a source vertex. Therefore, when the cluster performs preprocessing, an incoming edge of the destination vertex (i.e., an outgoing edge of the source vertex) and the destination vertex can be partitioned to the same computer, so that the destination vertex can receive information of the source vertex by using this edge. However, in this way, the computer processing the source vertex does not have information of the outgoing edge of the source vertex. Without the information of the outgoing edge, the computer processing the source vertex cannot know the computer on which the corresponding destination vertex is updated. Therefore, the computer processing the source vertex needs to broadcast the information of the source vertex indiscriminately to all computers.

An existing distributed graph computing system Gemini is used as an example. Gemini can pass messages in pull or push mode. In pull or push mode, Gemini broadcasts the message of the vertex indiscriminately to all computers.

In fact, not all computers need the information of the vertex. The computer needs the information of the vertex only when the computer needs to update the corresponding destination vertex by using the vertex. Therefore, broadcasting the message of the vertex indiscriminately to all computers causes huge unwanted communication and network overheads.

FIG. 1 shows a communication method applied to a computer cluster according to an embodiment of the present disclosure.

The method is applicable to a first computer in a computer cluster. The first computer may be any computer in the computer cluster. The computer cluster may further include a second computer. The computer cluster is configured to perform distributed computing on the graph data. The graph data includes a first vertex set and a second vertex set. The first computer is configured to process a vertex in the first vertex set of the graph data. The second computer is configured to process a vertex in the second vertex set of the graph data. The first vertex set includes a first source vertex, and the second vertex set includes a first destination vertex. It can be understood that the graph data can be divided into a plurality of vertex sets, and the first vertex set and the second vertex set are any two of the plurality of vertex sets.

The communication method applied to a computer cluster shown in FIG. 1 includes steps S110 to S130.

Step S110: Generate information of the first source vertex.

Generating the information of the vertex may be representing the vertex by using a graph embedding vector. Alternatively, generating the information of the vertex may be updating the information of the vertex. For example, the first source vertex may be discrete data, and the first computer represents the first source vertex as a graph embedding vector to generate the information of the first source vertex. Alternatively, the first source vertex may be a destination vertex corresponding to another vertex, and the first computer can update the information of the first source vertex based on information of a source vertex corresponding to the first source vertex.

The first source vertex may be a vertex needed by another computer in the cluster. For example, if the first destination vertex corresponding to the first source vertex is processed by the second computer, the second computer needs the information of the first source vertex.

Step S120: Determine the second computer based on pre-recorded mapping relationship information.

The mapping relationship information can be used to indicate a mapping relationship between a vertex in the graph data and a computer in the cluster. Based on the mapping relationships, it can be determined which computer(s) in the cluster need the information of the vertex. For example, the mapping relationship may include a relationship between a vertex and a computer that has an outgoing edge of the vertex.

The first source vertex is used as an example. The computer that needs the first source vertex can be acquired based on the mapping relationship information. For example, if the second computer is configured to process the first destination vertex corresponding to the first source vertex, the second computer is a computer that needs the first vertex. There may be a plurality of computers in the cluster that need the information of the first vertex. In this case, the second computer may be any one of the plurality of computers.

It can be understood that a plurality of vertices in the first vertex set that are processed by the first computer may all be source vertices, and step S120 can be performed on all the plurality of source vertices, so as to determine computers that have mapping relationships with the plurality of source vertices, respectively.

A method for recording the mapping relationship information is not limited in the present disclosure. For example, the mapping relationship information can be recorded in a list form. The list that records the mapping relationship may be referred to as a filter list. Each computer in the cluster can construct and/or store filter lists of other computers. The first computer is used as an example. When the first destination vertex corresponding to the first source vertex processed by the first computer is partitioned to the second computer, the first source vertex can be recorded in the filter list of the second computer.

It can be learned from the foregoing description that, the outgoing edge and the destination vertex can be processed on the same computer. Therefore, the list of vertices needed by the second computer can also record a source vertex corresponding to the outgoing edge partitioned to the second computer. For example, the first computer processes vertices a, b, c, d, etc., and outgoing edges of vertices a and c are partitioned to the second computer. In this case, the filter list of the second computer may include vertices a and c. In general, in the first vertex set processed by the first computer, only some of the vertices have outgoing edges partitioned to the second computer. Therefore, a quantity of vertices in the filter list may be less than a quantity of vertices in the first vertex set.

The pre-recording means storing or recording the mapping relationship in the mapping relationship information before step S130. For example, the computer in the cluster can compute and record the mapping relationship in the preprocessing phase. For example, during the preprocessing of graph data partitioning, the cluster can partition the first source vertex to the first computer, partition the first destination vertex corresponding to the first source vertex to the second computer, and meanwhile send the information of the first source vertex and the second computer to the first computer, so that the first computer records the mapping relationship between the first source vertex and the second computer.

Step S130: Send a first communication message to the second computer.

The communication message may be a message sent during interaction between computers in the cluster, so that a computer in the cluster acquires information of a vertex computed by another computer.

The first computer can send one or more communication messages to the second computer. For example, the first computer can send a first communication message to the second computer, and can further send a second communication message to the second computer. Alternatively, in the graph learning process, the graph data needs to be iteratively updated for a plurality of times. During each iteration, the first computer can send the first communication message to the second computer.

Each communication message may include information of one or more vertices. For example, the first communication message may include information of the first source vertex. Alternatively, in addition to the information of the first source vertex, the first communication message may further include information of another source vertex.

The second computer can receive a communication message sent by the first computer. For example, the second computer can receive the first communication message sent by the first computer. After receiving the communication message sent by the first computer, the second computer can feed back a receiving result to the first computer. For example, if the receiving fails, the second computer can feed back a receiving result indicating a receiving failure to the first computer, and the first computer can resend the communication message.

After receiving the communication message, the second computer can update the information of the destination vertex corresponding to the vertex based on the information of the vertex in the communication message. For example, the second computer can update the information of the first destination vertex based on the information of the first source vertex in the first communication message.

In step S120, whether the second computer needs the information of the first source vertex can be determined based on the mapping relationship. Then, in step S130, the information of the first source vertex can be pertinently sent to the second computer. For example, the first computer can filter, based on the filter list, information of a vertex to be sent to the second computer, so that only information of a vertex in the filter list can be sent to the second computer.

It can be understood that when the second computer does not include the destination vertex corresponding to the vertex processed by the first computer, the communication message may not be sent to the second computer, or the communication message does not include information of the vertex.

According to the present disclosure, the information of the vertex is pertinently transferred to the computer that processes the corresponding destination vertex, instead of broadcasting the information of the vertex indiscriminately to all computers in the cluster, thereby avoiding unwanted communication in a computer communication process in the cluster, and reducing network overheads of communication.

Optionally, step S110 in the method shown in FIG. 1 may include the step of generating a graph embedding vector corresponding to the first source vertex. Therefore, the first communication message sent to the second computer may include the graph embedding vector corresponding to the first source vertex.

During processing of the graph embedding vector, some operators such as ReLU or dropout can set some information in the graph embedding vector to 0, resulting in many zero elements in the graph embedding vector, which in turn leads to many zero elements in the first communication message. When transmitting the communication message, these zero elements occupy specific resources and increase network pressure.

Step S110 of the method provided in the present disclosure may further include: deleting some or all of zero elements in the graph embedding vector corresponding to the first source vertex, to obtain the information of the first source vertex.

Based on the above-mentioned steps, in the present disclosure, only non-zero data in the communication message is retained to implement compression of the communication message, thereby reducing an amount of transmitted data, relieving network pressure, and improving graph data processing efficiency.

As described above, computers in the cluster can communicate with each other by using communication messages. After the first computer sends the first communication message to the second computer, the first computer needs to receive a reply message from the second computer to determine whether the second computer has indeed received the first communication message. When a plurality of computers in the cluster simultaneously send communication messages to the second computer, the second computer needs to reply one by one to the computers that send the communication messages. This may cause a plurality of computers to wait for reply messages from the second computer at the same time, reducing communication efficiency, and thus reducing efficiency of computing graph data.

The present disclosure proposes that the first computer exchanges a communication message with another computer in the computer cluster in a round-robin manner. The exchange here may mean sending and/or receiving. For example, the first computer sends communication information to another computer in the cluster in a round-robin manner. Correspondingly, a computer that receives a communication message can receive the communication message in a reverse round-robin order. Alternatively, the first computer receives the communication information from another computer in the cluster in a round-robin manner.

It can be understood that a plurality of computers in the cluster each can send communication messages to other computers in a round-robin manner. When receiving communication messages, the plurality of computers receive, in a reverse round-robin order, communication messages sent by other computers. The starting locations in the round-robin cycles of the plurality of computers may be different, so that the plurality of computers do not send communication messages to the same computer simultaneously, thereby avoiding a case in which all computers wait for messages from the same computer simultaneously.

An example in which the cluster includes four computers is used as an example to describe a process in which computers in the cluster exchange communication information in a round-robin manner. IDs of the four computers may be 1, 2, 3, and 4, respectively. A sequence in which each computer sends a communication message to and/or receives a communication message from another computer may be shown in Table 1.

TABLE 1

| Computer ID | Sending sequence | Receiving sequence |
|---|---|---|
| 1 | 2, 3, 4, . . . , 2, 3, 4 | 4, 3, 2, . . . , 4, 3, 2 |
| 2 | 3, 4, 1, . . . , 3, 4, 1 | 1, 4, 3, . . . , 1, 4, 3 |
| 3 | 4, 1, 2, . . . , 4, 1, 2 | 2, 1, 4, . . . , 2, 1, 4 |
| 4 | 1, 2, 3, . . . , 1, 2, 3 | 3, 2, 1, . . . , 3, 2, 1 |

For the sending sequence, the computer 1 can cyclically send communication messages to three computers in a sequence of the computer 2, the computer 3, and the computer 4. Similarly, the computer 2, the computer 3, and the computer 4 send communication messages to other computers in the sequence shown in Table 1. The receiving sequence corresponds to the sending sequence. For example, the computer 1 can cyclically receive communication information from the three computers in a sequence of the computer 4, the computer 3, and the computer 2.

Based on the sequence shown in Table 1, a plurality of computers in the cluster can simultaneously send communication messages to different computers. In other words, the plurality of computers do not simultaneously send communication messages to the same computer.

When receiving a communication message, a computer can receive information of a plurality of source vertices. For example, the first vertex set processed by the first computer is used as an example. The first vertex set may include a plurality of destination vertices. The plurality of destination vertices correspond to the plurality of source vertices. The first computer can receive a second communication message. The second communication message includes information of the plurality of source vertices.

The computer can divide the received information of the plurality of source vertices into a plurality of batches. The computer can process the plurality of batches in parallel based on a plurality of threads, so as to update the information of the destination vertices, thereby improving computing efficiency.

In addition, based on the above-mentioned steps, information of a plurality of source vertices corresponding to different destination vertices is allocated to different batches for parallel processing. In other words, a plurality of source vertices corresponding to the same destination vertex can be allocated to the same batch. This prevents the plurality of source vertices corresponding to the same destination vertex from updating the destination vertex simultaneously, thereby avoiding contention. For example, source vertices v1 and v2 corresponding to the destination vertex u are both allocated to batch 1. During parallel processing of batch 1 and batch 2, data of the destination vertex u is not updated simultaneously based on the source vertices v1 and v2, thereby avoiding contention.

When receiving information of a vertex, a computer in the computer cluster may wait until information of all neighboring vertices is collected before computation. However, this increases time overheads of information synchronization between different computers, and also requires relatively large memory space to store the information of the neighboring vertices. When the memory of the computer is limited, an external storage resource on the computer can be used as an extension of the memory. For example, a communication message can be stored in an external storage (which may also be referred to as disk storage). When needed, the communication message can be loaded from the external storage into the memory, increasing input/output (I/O) overheads between the external storage and the memory. Therefore, in a distributed external storage scenario, bottlenecks such as I/O between the external storage and the memory, network communication, and CPU computation need to be considered together.

The method provided in the present disclosure can process communication messages in real time. After receiving information of some vertices, the computer can process the information of these vertices. Optionally, the computer can record intermediate results during processing of partial information. Based on this method, the computer can start to update a vertex without a need to wait until information of all neighboring vertices of the vertex is collected. According to this method, time overheads for waiting for a communication message are reduced, and there is no need to store the communication message in an external storage, and therefore I/O overheads between the external storage and the memory do not increase due to disk storage.

It should be noted that the computer described in the present disclosure may be a computing device with a computing function, such as a server.

Some method embodiments of the present disclosure have been described in detail above with reference to FIG. 1. Some apparatus embodiments of the present disclosure are described in detail below with reference to FIG. 2 and FIG. 3. It should be understood that the descriptions of the method embodiments correspond to the descriptions of the apparatus embodiments. Therefore, for a part not described in detail, references can be made to the above-mentioned method embodiments.

Figure 2:
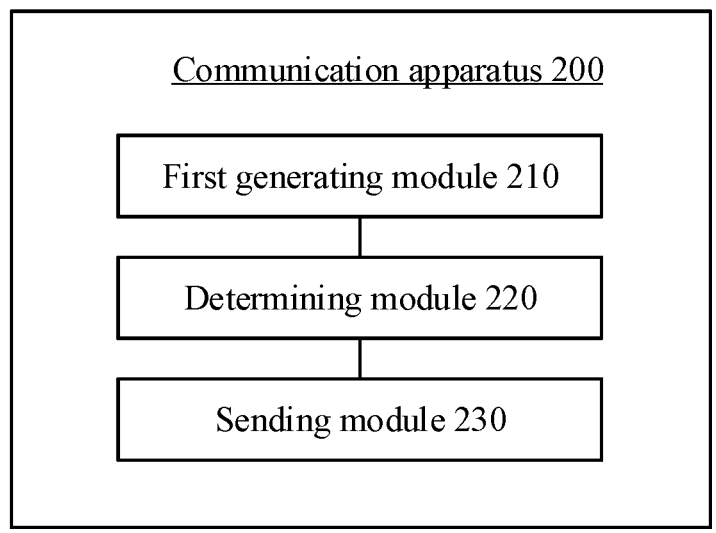
FIG. 2 is a schematic structural diagram of a communication apparatus according to an embodiment of the present disclosure.

FIG. 2 is a schematic structural diagram of a communication apparatus 200 according to an embodiment of the present disclosure. The communication apparatus is a first computer in a computer cluster, the computer cluster is configured to perform distributed computing on graph data, the computer cluster further includes a second computer, the first computer is configured to process a vertex in a first vertex set in the graph data, the second computer is configured to process a vertex in a second vertex set in the graph data, the first vertex set includes a first source vertex, the second vertex set includes a first destination vertex corresponding to the first source vertex. The communication apparatus 200 may include a first generating module 210, a determining module 220, and a sending module 230.

The first generating module 210 is configured to generate information of the first source vertex.

The determining module 220 is configured to determine the second computer based on pre-recorded mapping relationship information, where the second computer is configured to process information of the first destination vertex.

The sending module 230 is configured to send a first communication message to the second computer, where the first communication message includes the information of the first source vertex, so that the second computer updates the information of the first destination vertex based on the information of the first source vertex.

Optionally, the first generating module 210 may include: a second generating module, configured to generate a graph embedding vector corresponding to the first source vertex; and a deleting module, configured to delete some or all of zero elements in the graph embedding vector corresponding to the first source vertex, to obtain the information of the first source vertex.

Optionally, the first computer exchanges a communication message with another computer in the computer cluster in a round-robin manner.

Optionally, the first vertex set further includes a plurality of destination vertices, and the plurality of destination vertices respectively correspond to a plurality of source vertices; the communication apparatus 200 further includes: a receiving module, configured to receive a second communication message, where the second communication message includes information of the plurality of source vertices; and a processing module, configured to process the information of the plurality of source vertices in parallel by using a plurality of threads.

Optionally, the computer cluster performs a graph learning task based on the graph data.

Figure 3:
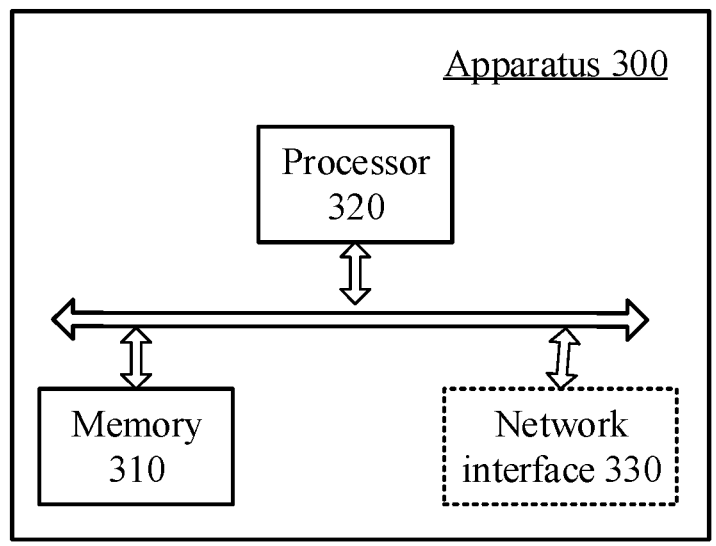
FIG. 3 is a schematic structural diagram of another apparatus according to an embodiment of the present disclosure.

FIG. 3 is a schematic structural diagram of an apparatus according to another embodiment of the present disclosure. The apparatus 300 may be, for example, a computing device with a computing function. For example, the apparatus 300 may be a server. The apparatus 300 may include a memory 310 and a processor 320. The memory 310 can be configured to store executable code. The memory 310 can be further configured to store graph data. The processor 320 can be configured to execute the executable code stored in the memory 310 to implement the steps in the methods described above. In some embodiments, the apparatus 300 may further include a network interface 330, and data exchange between the processor 320 and an external device can be implemented by using the network interface 330.

All or some of the above-mentioned embodiments can be implemented by using software, hardware, firmware, or any combination thereof. When being implemented by software, the embodiments can be implemented completely or partially in a form of a computer program product. The computer program product includes one or more computer instructions. When the computer program instructions are loaded and executed on the computer, the procedure or functions according to the embodiments of the present disclosure are completely or partially generated. The computer may be a general-purpose computer, a dedicated computer, a computer network, or another programmable apparatus. The computer instructions can be stored in a computer-readable storage medium or can be transmitted from a computer-readable storage medium to another computer-readable storage medium. For example, the computer instructions can be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid state disk (SSD), etc.

A person of ordinary skill in the art can be aware that the units and algorithm steps of each example described with reference to the embodiments of the present disclosure can be implemented by using electronic hardware, or a combination of computer software and electronic hardware. Whether these functions are performed by using hardware or software depends on a specific application and design constraints of the technical solutions. A skilled person can use different methods for each specific application to implement the described functions, but this implementation should not be considered as beyond the scope of the present disclosure.

In the several embodiments provided in the present disclosure, it should be understood that the disclosed system, apparatus, and method can be implemented in other ways. For example, the apparatus embodiments described above are merely examples. For example, the unit division is merely logical function division and may be other division in actual implementation. For example, a plurality of units or components can be combined or integrated into another system, or some features may be ignored or not performed. In addition, the displayed or discussed mutual couplings or direct couplings or communication connections can be implemented through some interfaces. The indirect couplings or communication connections between the apparatuses or units can be implemented in electronic, mechanical, or other forms.

The units described as separate components may or may not be physically separate, and components displayed as units may or may not be physical units, can be located in one position, or can be distributed on a plurality of network units. Some or all of the units can be selected depending on actual needs to achieve the purposes of the solutions of the embodiments.

In addition, the functional units in the embodiments of the present disclosure can be integrated into one processing unit, or each of the units can exist alone physically, or two or more of the units can be integrated into one unit.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

The foregoing descriptions are merely example embodiments of the present disclosure, but are not intended to limit the present disclosure. Any modification or equivalent replacement made without departing from the spirit and principle of the present disclosure shall fall within the protection scope of the present disclosure.

What is claimed is:

1. A communication method applied to a computer cluster, wherein the computer cluster is configured to perform distributed computing on graph data, the computer cluster comprises a first computer and a second computer, the first computer is configured to process a vertex in a first vertex set in the graph data, the second computer is configured to process a vertex in a second vertex set in the graph data, the first vertex set comprises a first source vertex, the second vertex set comprises a first destination vertex corresponding to the first source vertex, and the method is applied to the first computer, the method comprises:

generating information of the first source vertex;

determining the second computer based on pre-recorded mapping relationship information, wherein the second computer is configured to process information of the first destination vertex; and sending a first communication message to the second computer, wherein the first communication message comprises the information of the first source vertex, so that the second computer updates the information of the first destination vertex based on the information of the first source vertex.

2. The method according to claim 1, wherein the generating information of the first source vertex comprises:

generating a graph embedding vector corresponding to the first source vertex; and deleting some or all of zero elements in the graph embedding vector corresponding to the first source vertex, to obtain the information of the first source vertex.

3. The method according to claim 1, wherein the first computer exchanges a communication message with another computer in the computer cluster in a round-robin manner.

4. The method according to claim 1, wherein the first vertex set further comprises a plurality of destination vertices, and the plurality of destination vertices respectively correspond to a plurality of source vertices;

the method further comprises:

receiving a second communication message, wherein the second communication message comprises information of the plurality of source vertices; and processing the information of the plurality of source vertices in parallel by using a plurality of threads.

5. The method according to claim 1, wherein the computer cluster performs a graph learning task based on the graph data.

6. A communication apparatus, wherein the communication apparatus is a first computer in a computer cluster, the computer cluster is configured to perform distributed computing on graph data, the computer cluster further comprises a second computer, the first computer is configured to process a vertex in a first vertex set in the graph data, the second computer is configured to process a vertex in a second vertex set in the graph data, the first vertex set comprises a first source vertex, the second vertex set comprises a first destination vertex corresponding to the first source vertex, and the communication apparatus comprises a processor executing instructions stored in memory to implement:

generating module, configured to generate information of the first source vertex;

determining module, configured to determine the second computer based on pre-recorded mapping relationship information, wherein the second computer is configured to process information of the first destination vertex; and sending module, configured to send a first communication message to the second computer, wherein the first communication message comprises the information of the first source vertex, so that the second computer updates the information of the first destination vertex based on the information of the first source vertex.

* * * * *